United States Patent
Khare

(10) Patent No.: US 6,479,429 B1
(45) Date of Patent: *Nov. 12, 2002

(54) PARTICULATE COMPOSITIONS

(75) Inventor: Gyanesh P. Khare, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/971,306

(22) Filed: Nov. 17, 1997

Related U.S. Application Data

(63) Continuation of application No. 08/479,059, filed on Jun. 7, 1995, now Pat. No. 5,710,091.

(51) Int. Cl.[7] .......................... B01J 20/00; B01J 23/02
(52) U.S. Cl. .................. 502/414; 502/341; 502/342; 502/424
(58) Field of Search ................. 502/341, 342, 502/414, 424, 439

(56) References Cited

U.S. PATENT DOCUMENTS

| | | | | |
|---|---|---|---|---|
| 3,470,262 A | | 9/1969 | Michaels et al. | 260/680 |
| 3,641,182 A | | 2/1972 | Box, Jr. et al. | 260/680 R |
| 3,668,151 A | | 6/1972 | Walker | 252/466 |
| 3,670,044 A | | 6/1972 | Drehman et al. | 260/683.3 |
| 3,674,706 A | | 7/1972 | Box, Jr. et al. | 252/412 |
| 4,005,985 A | | 2/1977 | Hutson, Jr. | 23/288 R |
| 4,041,099 A | | 8/1977 | Hutson, Jr. | 260/683.3 |
| 4,152,365 A | | 5/1979 | Drehman | 585/256 |
| 4,212,769 A | * | 7/1980 | Antos | 252/441 |
| 4,260,845 A | | 4/1981 | Shioyama | 585/640 |
| 4,263,020 A | * | 4/1981 | Eberly, Jr. | 55/62 |
| 4,363,790 A | | 12/1982 | Anderson et al. | 423/230 |
| 4,370,310 A | | 1/1983 | Walker | 423/600 |
| 4,374,046 A | | 2/1983 | Antos | 252/466 B |
| 4,409,127 A | | 10/1983 | Keppel et al. | 502/205 |
| 4,431,750 A | | 2/1984 | McGinnis et al. | 502/329 |
| 4,458,098 A | | 7/1984 | Antos | 585/660 |
| 4,690,806 A | | 9/1987 | Schorfheide | 423/230 |
| 4,713,233 A | * | 12/1987 | Marsh et al. | 423/608 |
| 4,729,889 A | | 3/1988 | Flytani-Stephanopoulos et al. | 423/593 |
| 4,888,157 A | | 12/1989 | Carnell et al. | 423/230 |
| 4,888,317 A | | 12/1989 | De Angeles et al. | 502/60 |
| 5,124,293 A | | 6/1992 | Lindfors et al. | 502/60 |
| 5,151,401 A | | 9/1992 | Schubert et al. | 502/329 |
| 5,220,091 A | | 6/1993 | Brinkmeyer et al. | 585/660 |
| 5,234,884 A | | 8/1993 | Mouri et al. | 502/405 |
| 5,344,805 A | | 9/1994 | Khare et al. | 502/329 |
| 5,710,091 A | * | 1/1998 | Khare | 502/341 |

FOREIGN PATENT DOCUMENTS

FR     1 604 707     3/1972

* cited by examiner

*Primary Examiner*—Alexander Ghyka
(74) *Attorney, Agent, or Firm*—Richmond, Hitchcock, Fish & Dollar

(57) ABSTRACT

A process to produce a sorbent composition is provided. This process comprises: (a) contacting a zinc component, an alumina component, and a dispersant component, to form a mixture; and then (b) spray drying said mixture to form particles; and then (c) contacting said particles with a zinc compound, wherein said zinc compound is zinc oxide, or it is a compound convertible to zinc oxide, to form a sorbent composition. A process to produce a particulate composition that comprises zinc aluminate is provided. This comprises: (a) contacting a zinc component, an alumina component, and a dispersant component, to form a mixture; and then (b) spray drying said mixture to form said particulate composition.

44 Claims, No Drawings

PARTICULATE COMPOSITIONS

This application is a Continuation of application Ser. No. 08/479,059, which was filed on Jun. 7, 1995, now U.S. Pat. No. 5,710,091.

BACKGROUND

This invention relates to the field of sorbent compositions.

This invention relates to the field of particulate compositions.

Fluidized bed reactors have advantages over fixed bed reactors such as better heat transfer and better pressure drop. Fluidized bed reactors generally use reactants that are particulates. The size of these particulates is generally in the range of about 1 to about 1000 microns. However, the reactants used generally do not have sufficient thermal stability and sufficient attrition resistance for all applications.

The removal of sulfur from fluid streams has long been desirable, as well as necessary, for a variety of reasons. If a sulfur-containing-fluid-stream is to be released as a waste stream, removal of such sulfur from the fluid stream is often necessary to meet certain environmental regulations. If a sulfur-containing-fluid-stream is to be used in a catalytic process, removal of such sulfur is often necessary to prevent catalyst poisoning. Sulfur-containing-fluid-streams are sometimes used in fluidized bed reactors. Fluidized bed reactors have advantages over fixed bed reactors such as better heat transfer and better pressure drop. Fluidized bed reactors generally use reactants that are particulates. The size of these particulates is generally in the range of about 1 to about 1000 microns. However, the reactants used generally do not have sufficient thermal stability and sufficient attrition resistance for all applications. Consequently, finding a sorbent that removes sulfur from these fluid streams and that can be used in fluidized bed reactors is desirable.

SUMMARY

It is an object of this invention to provide a process to produce a particulate composition.

It is another object of this invention to provide a process to produce a particulate composition that has improved thermal stability and improved attrition resistance and that can be used in a wide variety of applications.

In accordance with this invention a process is provided to produce a particulate composition that comprises zinc aluminate. This process comprises: (a) contacting a zinc component, an alumina component, a dispersant component, to form a mixture, and the (b) spray drying said mixture to form said particulate composition.

It is an object of this invention to provide a process to produce a sorbent composition.

It is another object of this invention to provide a process to produce a sorbent composition that has improved thermal stability and improved attrition resistance and that can be used in fluidized bed reactors.

In accordance with this invention a process is provided to produce a sorbent composition. This process comprises: (a) contacting a zinc component, an alumina component, and a dispersant component, to form a mixture; and then (b) spray drying said mixture to form particles; and then (c) contacting said particles with a zinc compound, wherein said zinc compound is zinc oxide, or it is a compound convertible to zinc oxide, to form a sorbent composition.

DETAILED DESCRIPTION OF THE INVENTION

Generally, the zinc component is zinc oxide. However, it may be any zinc compound that combines with alumina to form zinc aluminate under the conditions of preparation described herein. Examples of such compounds include, but are not limited to, zinc sulfide, zinc sulfate, zinc hydroxide, zinc carbonate, zinc acetate, zinc nitrate, zinc chloride, zinc bromide, zinc iodide, zinc oxychloride, and zinc stearate. Mixtures of such compounds can also be used. The amount of the zinc component used is in the range of about 5 to about 75 weight percent based on the total weight of the components. However, an amount in the range of about 15 to about 60 weight percent is preferred and an amount in the range of about 25 to about 45 weight percent is most preferred.

The alumina component can be any suitable alumina or aluminosilicate. The alumina component should combine with the zinc component, under the conditions of preparation herein, to form zinc aluminate. Suitable alumina components include, but are not limited to, hydrated alumina and flame-hydrolyzed alumina. The amount of the alumina component used is in the range of about 5 to about 90 weight percent based on the total weight of the components. However, an amount in the range of about 25 to about 75 weight percent is preferred and an amount in the range of about 40 to about 65 weight percent is most preferred.

The dispersant component can be any suitable compound that helps to promote the spray drying ability of the mixture. In particular, these components are useful in preventing deposition, precipitation, settling, agglomerating, adhering, and caking of solid particles in a fluid medium. Suitable dispersants include, but are not limited to, condensed phosphates and sulfonated polymers. The term condensed phosphates refers to any dehydrated phosphate where the $H_2O:P_2O_5$ is less than about 3:1. Specific examples of suitable dispersants include, but are not limited to, sodium pyrophosphate, sodium metaphosphate, and sulfonated styrene maleic anhydride polymer. The amount of the component used is in the range of about 0.01 to about 10 weight percent based on the total weight of the components. However, an amount in the range of about 0.1 to about 8 weight percent is preferred and an amount in the range of about 1 to about 3 weight percent is most preferred.

In a preferred embodiment of the invention a binder component is used. The binder component can be any suitable compound that has cement-like properties, or clay-like properties, which can help to bind the particulate composition together. Suitable examples of such binder components include, but are not limited to, cements such as, for example, gypsum plaster, common lime, hydraulic lime, natural cements, portland cements, and high alumina cements, and clays, such as, for example, attapulgite, bentonite, halloysite, hectorite, kaolinite, montmorillonite, pyrophylite, sepiolite, talc, and vermiculite. A particularly preferred binder component is calcium aluminate cement. The amount of binder component used is in the range of about 0.1 to about 30 weight percent based on the total weight of the components. However, an amount in the range of about 1 to about 20 weight percent is preferred and an amount in the range of about 5 to about 15 weight percent is most preferred.

In another preferred embodiment of the invention an acid component is used. The acid component can be any suitable acid that can help form zinc aluminate from the zinc component and the alumina component. In general, the acid component can be an organic acid or a mineral acid. If the acid component is an organic acid it is preferred if it is a carboxylic acid. If the acid component is a mineral acid preferably it is a nitric acid, a phosphoric acid, or a sulfuiric acid. Mixtures of these acids can also be used. Generally, the acid is used with water to form a dilute aqueous acid solution. The amount of acid in the acid component is in the range of about 0.01 to about 20 volume percent based on the total volume of the acid component. However, it is preferred if the amount is in the range of about 0.1 to 10 volume percent and it is most preferred if the amount is in the range of about 1 to about 5 volume percent. In general, the amount of acid component to use is based on the amount the dry components. That is, the ratio of all the dry components (in grams) to the acid component (in milliliters) should be less than about 1.75:1. However, it is preferred if this ratio is less than about 1.25:1 and it is more preferred if it is less than about 0.75:1. These ratios will help to form a mixture that is a liquid solution, a slurry, or a paste that is capable of being dispersed in a fluid like spray.

The zinc component, alumina component, and dispersant component can be contacted together in any manner known in the art that will form a mixture that is a liquid solution, a slurry, or a paste that is capable of being dispersed in a fluid like spray. When the zinc component, alumina component, and dispersant component are solids then they should be contacted in a liquid medium to form a mixture that is a liquid solution, a slurry, or a paste that is capable of being dispersed in a fluid like spray. In another embodiment of the invention, the zinc component and the alumina component can be contacted together to form a composition comprising zinc aluminate and then this zinc aluminate composition is contacted with a dispersant. Suitable means for contacting these components are known in the art such as, for example, tumblers, stationary shells, troughs, muller mixers, impact mixers, and the like. If desired, a binder component can be contacted with the other components to form, among other things, a composition that has improved attrition resistance. Generally, these components, after contacting to form a mixture, are contacted with the acid component. However, the dry components and the acid components can be contacted together simultaneously or separately. The ratio of all the dry components (in grams) to the components that are liquids (in milliliters) should be less than about 1.75:1. However, it is preferred if this ratio is less than about 1.25:1 and it is more preferred if it is less than about 0.75:1. These ratios will help to form a mixture that is a liquid solution, a slurry, or a paste that is capable of being dispersed in a fluid like spray.

After the components are contacted together to form a mixture, they are subjected to spray drying to form a particulate composition having particles that have a size from about 1 to about 1000 microns. Spray drying is known in and art and is discussed in *PERRY'S CHEMICAL ENGINEERS' HANDBOOK*, sixth edition, published by McGraw-Hill, Inc. at pages 20–54 through 20–58. Additional information can be obtained, especially from the bibliography, from the *HANDBOOK OF INDUSTRIAL DRYING*, published by Marcel Dekker. Inc. pages 243 through 293. The particulate compositions formed can have a size from about 10 to about 1000 microns. However, it is preferred if the size of the particles is from about 30 to about 300 and it is most preferred if the size is from about 50 to about 100 microns.

The dried, particulate composition can then be calcined to form a calcined, particulate composition. The calcination can be conducted under any suitable conditions that remove residual water, oxidize any combustibles, and effect the combination of the zinc component and the alumina component to form zinc aluminate. Usually, the dried composition is then calcined in an oxygen containing ambient. Generally, the temperature that the calcination takes place at is in the range of about 300 to about 1200° C. However, it is more preferred if the temperature is in the range of about 450 to about 1000° C. The calcination should be conducted for a period of time in the range of about 0.5 to about 12 hours.

After the dried particulate composition is formed, or after the calcined, dried particulate composition is formed, it can be contacted with zinc compound. Generally, the zinc compound is zinc oxide. However, it may be any zinc compound that is convertible to zinc oxide under the conditions of preparation herein. Examples of such compounds include, but are not limited to, zinc sulfide, zinc sulfate, zinc hydroxide, zinc carbonate, zinc acetate, zinc nitrate, zinc chloride, zinc bromide, zinc iodide, zinc oxychloride, and zinc stearate. Mixtures of such compounds can also be used. The amount of the zinc compound used is in the range of about 5 to about 75 weight percent based on the total weight of the components. However, an amount in the range of about 15 to about 60 weight percent is preferred and an amount in the range of about 25 to about 45 weight percent is most preferred. In a preferred embodiment, the dried particulate composition, or the calcined, dried particulate composition can be contacted with a liquid medium that comprises a soluble zinc compound. Generally, the soluble zinc compound is a compound that is convertible to zinc oxide during the preparation of the sorbent composition. The liquid medium can be any medium such as, for example, water and organic solvents. Examples of soluble zinc compounds include, but are not limited to, zinc sulfide, zinc sulfate, zinc carbonate, zinc acetate, zinc nitrate, zinc chloride, zinc bromide, and zinc iodide. Mixtures of these soluble zinc compounds can also be used.

The liquid medium that comprises the soluble zinc compound can be contacted with the particulate composition in any manner known in the art. One such method is the impregnation of the particulate composition with the liquid medium. After the particulate composition has been mixed with the liquid medium that comprises the soluble zinc compound, the composition is dried and calcined. This composition is preferably dried at a temperature in the range of about 50° C. to about 300° C., but more preferably, the drying temperature will range from about 100° C. to about 250° C., for a period of time in the range of about 0.5 hour to about 8 hours, more preferably in the range of about 1 hours to about 5 hours. This dried composition is then calcined in the presence of oxygen, or an oxygen-containing gas, at a temperature in the range of about 300° C. to about 800° C., and more preferably in the range of about 450° C. to about 750° C., to remove residual water, oxidize any combustibles, and effect the conversion of at least a portion of the zinc compound to zinc oxide. The time required for this calcining step will generally be in the range of about 0.5 hour to about 4 hours, and will preferably be in the range of about 1 hour to about 3 hours.

If desired, a metal oxide component can be added to the composition. These metal oxide components can improve the physical and chemical properties of the sorbent composition. For example, these metal oxide components can increase the ability of the sorbent composition to hydrogenate various compounds. Examples of suitable metal oxide components include, but are not limited to, iron oxide, cobalt oxide, nickel oxide, ruthenium oxide, rhodium oxide, palladium oxide, osmium oxide, iridium oxide, platinum oxide, copper oxide, chromium oxide, titanium oxide, zirconium oxide, tin oxide, and manganese oxide. The amount of metal oxide component in the sorbent composition is in the range of about 0.01 to about 20 weight percent based on the weight of the sorbent composition. However, it is more preferable if the amount is in the range of about 0.1 to about 15 weight percent, and most preferably the amount is in the range of about 1 to about 10 weight percent.

The metal oxide component can be added to the sorbent composition in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates and mixtures of any two or more thereof.

The elemental metal, metal oxide, and/or metal-containing compounds can be added to the sorbent composition by any method known in the art. One such method is the impregnation of the sorbent composition with a liquid medium, either aqueous or organic, that contains the elemental metal, metal oxide, and/or metal-containing compounds. After the elemental metal, metal oxide, and/or metal-containing compounds have been added to the sorbent composition, the composition is dried and calcined.

The elemental metal, metal oxide, and/or metal-containing compounds can be added to the particulate composition as components of the original mixture, or they can be added after the particulate composition has been spray dried and calcined, or after the soluble zinc compound has been added to the particulate composition and dried and calcine. If the metal oxide is added to the particulate composition after it has been spray dried and calcined, or if the metal oxide is added to the sorbent composition after it has been dried and calcined, the composition should be dried and calcined a second time. This composition is preferably dried at a temperature in the range of about 50° C. to about 300° C., but more preferably, the drying temperature will range from about 100° C. to about 250° C., for a period of time in the range of about 0.5 hour to about 8 hours, more preferably in the range of about 1 hours to about 5 hours. This dried composition is then calcined in the presence of oxygen, or an oxygen-containing gas, at a temperature in the range of about 300° C. to about 800° C., and more preferably in the range of about 450° C. to about 750° C., until volatile matter is removed and until at least a portion of the elemental metal and/or the metal-containing compounds is converted to a metal oxide. The time required for this calcining step will generally be in the range of about 0.5 hour to about 4 hours, and will preferably be in the range of about 1 hour to about 3 hours.

The sorbent compositions of this invention can be used in sulfur removal processes where there is achieved a contacting of the sorbent composition with a sulfur-containing gaseous feed stream, and thereafter, of the sorbent composition with oxygen or an oxygen-containing gas which is utilized to regenerate the sorbent composition. Examples of such sulfur removal processes are disclosed in U.S. Pat. Nos. 4,990,318; 5,077,261; 5,102,854; 5,108,975; 5,130,288; 5,174,919; 5,177,050; 5,219,542; 5,244,641; 5,248,481; and 5,281,445; the disclosures of which are hereby incorporated by reference.

EXAMPLES

These examples are provided to illustrate the invention and are not meant to be construed as limiting the invention.

Example One

This Example demonstrates forming the particulates used in this invention.

Part A

One hundred twenty grams of zinc oxide, 188 grams of Vista Dispal alumina, 30 grams of Secar 71 calcium aluminate cement, 3.42 grams of sodium pyrophosphate, and 4.0 grams of tin oxide, were dry mixed. This dry mixture was slowly added with stirring to 500 milliliters of 2.0 volume percent aqueous acetic acid. The resulting slurry mixture was further mixed for 20 minutes and then filtered through a 60-mesh screen. This filtered slurry mixture was spray dried using a Yamato Model DL-41 spray drier at the following settings:

| | |
|---|---|
| Inlet Temperature | 220° C. |
| Outlet Temperature | 120° C. |
| Temperature Set Point | 300° C. |
| Feed Pump | 2.5 |
| Atomizing Air | 0.6 |
| Aspirator Air | 0.8 (rotameter) |
| Needle Knocker | 1.0 |
| Nozzle | SU-2A |

The resulting spray dried microspheres were calcined at 843° C. for 5 hours, ramping from ambient at about 3° C. per minute. The calcined material exhibited the following properties:

| Particle Size Distribution | |
|---|---|
| Mesh | Weight % |
| +120 | 0.1 |
| +270 | 53.2 |
| +325 | 13.1 |
| +400 | 18.6 |
| −400 | 15.1 |

Bulk Density (packed)1.0 g/cc (determined on the +270 and +325 mesh fractions from the combined and received products of several runs similar to that described).

Both the calcined material from above and a control material (Davison GXP-5, a commercial fluid cracking catalyst used in petroleum crackers) were tested for attrition resistance (percent attrition) using a procedure similar to that described in U.S. Pat. No. 4,010,116 (the disclosure of which is hereby incorporated by reference). The sample of the particulates used was obtained from a +270 mesh fraction of the combined and resieved products of several runs similar to the one described. This +270 mesh fraction was resieved on −80 and +230 mesh and 50 grams of the resulting material was used in the attrition test. The length of the attrition test was 5 hours. Percent attrition represents the amount of the material lost as fines, due to attrition, at the end of 5-hour tests.

| | Percent Attrition |
|---|---|
| Particulates | 7.66 |
| Control Catalyst | 4.59 |

Part B

In a separate preparation, one hundred twenty grams of zinc oxide, 188 grams of Vista Dispal alumina, 30 grams of Secar 71 calcium aluminate cement, 3.42 grams of sodium metaphosphate and 4.0 grams of tin oxide were dry mixed. This dry mixture was slowly added with stirring to 500 ml of 2.0 volume percent aqueous acetic acid. The resulting slurry mixture was further mixed for 30 minutes and then filtered through a 60-mesh screen. The filtered slurry mixture was slightly gelled, but would pour and pump easily. The filtered slurry was spray dried using the same equipment and conditions as indicated above, except that the nozzle was an SU-2 instead of an SU-2A. The spray dried material was calcined at 835° C. for 5 hours, ramping from ambient at about 3° C. per minute. A sieve analysis of the calcined material showed the following particle size distribution:

| Mesh | Weight % |
| --- | --- |
| +120 | 2.1 |
| +270 | 33.1 |
| +325 | 24.1 |
| +400 | 18.0 |
| -400 | 22.7 |

Part C

One hundred twenty grams of zinc oxide, 188 grams of Vista Dispal alumina, 30 grams of Secar 71 calcium aluminate cement, 3.42 grams of a sulfonated styrene maleic anhydride polymer, and 4.0 grams of tin oxide were dry mixed. The dry mixture was slowly added with stirring to 500 ml of 2.0 volume percent aqueous acetic acid. The resulting slurry mixture was further mixed for 30 minutes. At this point the slurry still had very low viscosity with no apparent gelling. The slurry was filtered through a 60-mesh screen and spray dried using the same equipment and conditions indicated above. The spray dried material was calcined at 835° C. for 5 hours, ramping from ambient at about 3° C. per minute. A sieve analysis of the calcined material showed the following particle size distribution.

| Mesh | Weight % |
| --- | --- |
| +120 | 16.2 |
| +270 | 27.4 |
| +325 | 8.8 |
| +400 | 13.7 |
| -400 | 33.9 |

Comparative Example One

This Example demonstrates the critical nature of the dispersant component in this invention. Described are five unsuccessful attempts to prepare mixtures suitable for spray drying in which the sodium pyrophosphate of Example One, Part A, has been replaced with another material.

Part A

One hundred twenty grams of zinc oxide, 188 grams of Vista Dispal alumina, 30 grams of Secar 71 calcium aluminate cement, and 4.0 grams of tin oxide were dry mixed. The dry mixture was slowly added with stirring to 500 ml of 2.0 volume percent aqueous acetic acid. To this was added 3.42 grams of sodium silicate. Stirring was continued for 5 minutes, at which time the mixture had gelled to the point it was too thick to be pumped for spray drying.

One hundred twenty grams of zinc oxide, 188 grams of Vista Dispal alumina, 30 grams of Secar 71 calcium aluminate cement, 3.42 grams of poly(acrylic acid) (molecular weight 200,000–450,000) and 4.0 grams of tin oxide were dry mixed. The dry mixture was slowly added with stirring to 500 ml of 2.0 volume percent aqueous acetic acid. During the addition, the mixture started to gel. When all of the powdered mixture had been added to the acetic acid (about 5 minutes), the mixture was too thick to be pumped for spray drying.

Part C

One hundred twenty grams of zinc oxide, 188 grams of Vista Dispal alumina, 30 grams of Secar 71 calcium aluminate cement, 3.42 grams of poly(acrylic acid) (molecular weight 200,000–450,000) and 4.0 grams of tin oxide were dry mixed. The mixture was slowly added with stirring to 500 grams of distilled water. The mixture gelled to the point it was too thick to be pumped for spray drying.

Part D

One hundred twenty grams of zinc oxide, 188 grams of Vista Dispal alumina, 30 grams of Secar 71 calcium aluminate cement, and 4.0 grams of tin oxide were dry mixed. Separately, 3.42 grams of a 65 weight percent aqueous solution of poly(acrylic acid) (molecular weight 2000) was mixed with 500 grams of distilled water. The solution tested weakly acidic with pH paper. With stirring, the dry mixture was slowly added to the weakly acidic solution. Before the addition of the dry mixture was complete, the liquid had gelled and become too thick to be pumped for spray drying.

Part E

One hundred twenty grams of zinc oxide, 188 grams of Vista Dispal alumina, 30 grams of Secar 71 calcium aluminate cement, and 4.0 grams of tin oxide were dry mixed. Separately, 3.42 grams of a 65 weight percent aqueous solution of poly(acrylic acid) (molecular weight 2000) was mixed with 500 grams of distilled water and 0.50 grams of sodium hydroxide. The solution tested weakly basic with pH paper. With stirring, the dry mixture was slowly added to the weakly basic solution. Before the addition of the dry mixture was complete, the liquid had gelled and become too thick to be pumped for spray drying.

Comparative Example Two

This Example demonstrates the critical nature of the dispersant component in this invention. This run shows that without the dispersant component a mixture is formed that is not capable of being dispersed in a fluid like spray.

Sixty grams of zinc oxide, 94 grams of Vista Dispal alumina, 15 grams of Secar 71 calcium aluminate cement, and 2.0 grams of tin oxide were dry mixed. The dry mixture was slowly added with stirring to 500 ml of 1.0 volume percent aqueous acetic acid. While stirring, the mixture gelled to the point that it was thick enough to be spooned. Spray drying was attempted but it clogged the nozzle almost immediately.

Example Two

This Example demonstrates the use of the zinc aluminate particles in forming a sorbent composition.

Fifty grams of the zinc aluminate particles prepared in Example One, Part A, were spray impregnated with a solution of 46 grams of zinc nitrate hexahydrate dissolved in 7 grams of warm deionized water. The impregnated granules were first surface dried using a heat gun, then calcined at 450° C. for one hour. The sorbent of this Example was further prepared by carrying out one more impregnation/drying/calcination step as described above.

Next, thirty-seven grams of the impregnated material from above was spray impregnated with a solution of 10.69 grams of nickel nitrate hexahydrate dissolved in 7.86 grams of deionized water. This material was then dried and calcined at 635° C. for one hour, ramping from ambient at 5° C. per minute.

The nickel-impregnated material from above was tested for sulfur loading. The test was carried out in a unit comprising a 20 mm O.D. quartz reactor and a 2 mm thermocouple well. The reactor was operated in a fixed bed up flow mode using 10 grams of the tested sorbent. The sorbent was heated to 538° C. in a stream of nitrogen. When the desired temperature was obtained, the nitrogen stream was replaced with a stream of simulated sulfur plant feed gas comprising 4.2 volume percent hydrogen sulfide, 40.0 volume percent carbon dioxide and 55.8 volume percent nitrogen. The gas hourly space velocity was 1450 cc/cc sorbent/hour. Sulfur loading was monitored by measuring the concentration of hydrogen sulfide in the reactor effluent, using a General Monitors hydrogen sulfide monitor suited to the concentration ranges encountered. Once the sorbent was fully loaded, as evidenced by hydrogen sulfide breakthrough, the flow of the simulated sulfur plant gas to the reactor was halted and the reactor was purged with nitrogen for 45 minutes while it was heated to a regeneration temperature of 593° C. The loaded sorbent was regenerated in a stream of air at 200 cc/minute for about 5 hours. Then the reactor was purged with nitrogen for about 40 minutes as it was cooled to 538° C. Then, the nitrogen flow was halted and the flow of simulated sulfur plant feed gas was resumed to begin another absorption cycle. The process was repeated for the desired number of cycles. The results of the test are shown below in Table I.

TABLE I

Results of Sulfur Absorbency Test

| Temperature, ° C. | Cycle | Sulfur Loading, %* |
|---|---|---|
| 538 | 1 | 3.9 |
| 538 | 2 | 6.9 |
| 538 | 3 | 8.0 |
| 538 | 4 | 8.4 |

*The weight percent sulfur in absorbent at hydrogen sulfide breakthrough.

The results shown in Table I show the sorbent composition of this invention to be highly effective in sulfur removal from gases.

That which is claimed:

1. A process to produce a particulate composition that comprises zinc aluminate, where said particulate composition comprises particles that have a size from about 30 to about 1000 microns, said process comprising:
    (a) contacting
        (1) a zinc component,
        (2) an alumina component, and
        (3) a dispersant component, to form a mixture, where said mixture is capable of being spray dried; and then
    (b) spray drying said mixture to form particles; and then
    (c) calcining said particles to combine said zinc component and said alumina component to produce a particulate composition that comprises zinc aluminate, where said particulate composition comprises particles that have a size from about 30 to about 1000 microns and where said calcining is conducted at a temperature in the range of about 300° C. to about 1200° C. for a time in the range of about 0.5 to about 12 hours;

wherein said zinc component is zinc oxide, or any other zinc compound, which can combine with said alumina component to form zinc aluminate during step (c), and wherein said alumina component comprises alumina, or aluminosilicate, where said alumina component can combine with said zinc component to form zinc aluminate during step (c), and wherein said dispersant component promotes the spray drying ability of said mixture.

2. A process according to claim 1 wherein said zinc component is selected from the group consisting of zinc oxide, zinc sulfide, zinc sulfate, zinc hydroxide, zinc carbonate, zinc acetate, zinc nitrate, zinc chloride, zinc bromide, zinc iodide, zinc oxychloride, zinc stearate and mixtures thereof.

3. A process according to claim 2 wherein the amount of the zinc component used is in the range of about 15 to about 60 weight percent based on the total weight of the components.

4. A process according to claim 3 wherein said alumina component consists essentially of alumina.

5. A process according to claim 4 wherein the amount of the alumina component used is in the range of about 30 to about 75 weight percent based on the total weight of the components.

6. A process according to claim 5 wherein said dispersant component is selected from the group consisting of condensed phosphates, sulfonated polymers and mixtures thereof.

7. A process according to claim 6 wherein the amount of the dispersant component used is in the range of about 0.1 to about 8 weight percent based on the total weight of the components.

8. A process to produce a particulate composition that comprises zinc aluminate, where said particulate composition comprises particles that have a size from about 30 to about 1000 microns, said process comprising:
    (a) contacting
        (1) a zinc component,
        (2) an alumina component,
        (3) a dispersant component, and
        (4) a binder component to form a mixture, where said mixture is capable of being spray dried; and then
    (b) spray drying said mixture to form particles; and then
    (c) calcining said particles to combine said zinc component and said alumina component to produce a particulate composition that comprises zinc aluminate, where said particulate composition comprises particles that have a size from about 30 to about 1000 microns and where said calcining is conducted at a temperature in the range of about 300° C. to about 1200° C. for a time in the range of about 0.5 to about 12 hours;

wherein said zinc component is zinc oxide, or any other zinc compound, which can combine with said alumina component to form zinc aluminate during step (c), and wherein said alumina component comprises alumina, or aluminosilicate, where said alumina component can combine with said zinc component to form zinc aluminate during step (c), and wherein said dispersant component promotes the spray drying ability of said mixture, and wherein said binder component is a cement or clay.

9. A process according to claim 8 wherein said zinc component is selected from the group consisting of zinc oxide, zinc sulfide, zinc sulfate, zinc hydroxide, zinc carbonate, zinc acetate, zinc nitrate, zinc chloride, zinc bromide, zinc iodide, zinc oxychloride, zinc stearate and mixtures thereof.

10. A process according to claim 9 wherein the amount of the zinc component used is in the range of about 15 to about 60 weight percent based on the total weight of the components.

11. A process according to claim 8 wherein said alumina component consists essentially of alumina.

12. A process according to claim 11 wherein the amount of the alumina component used is in the range of about 30 to about 75 weight percent based on the total weight of the components.

13. A process according to claim 12 wherein said dispersant component is selected from the group consisting of condensed phosphates, sulfonated polymers and mixtures thereof.

14. A process according to claim 13 wherein the amount of the dispersant component used is in the range of about 0.1 to about 8 weight percent based on the total weight of the components.

15. A process according to claim 14 wherein the amount of the binder component used is in the range of about 1 to about 20 weight percent based on the total weight of the components.

16. A process to produce a particulate composition that comprises zinc aluminate, where said particulate composition comprises particles that have a size from about 30 to about 1000 microns, said process comprising:
    (a) contacting
        (1) a zinc component,
        (2) an alumina component,
        (3) a dispersant component, and
        (4) an acid component to form a mixture, where said mixture is capable of being spray dried; and then
    (b) spray drying said mixture to form particles; and then
    (c) calcining said particles to combine said zinc component and said alumina component to produce a particulate composition that comprises zinc aluminate, where said particulate composition comprises particles that have a size from about 30 to about 1000 microns and where said calcining is conducted at a temperature in the range of about 300° C. to about 1200° C. for a time in the range of about 0.5 to about 12 hours;
wherein said zinc component is zinc oxide, or any other zinc compound, which can combine with said alumina component to form zinc aluminate during step (c), and wherein said alumina component comprises alumina, or aluminosilicate, where said alumina component can combine with said zinc component to form zinc aluminate during step (c), and wherein said dispersant component promotes the spray drying ability of said mixture, and wherein said acid component is an organic acid or a mineral acid that promotes the combination of the zinc component and the alumina component to form zinc aluminate.

17. A process according to claim 16 wherein said zinc component is selected from the group consisting of zinc oxide, zinc sulfide, zinc sulfate, zinc hydroxide, zinc carbonate, zinc acetate, zinc nitrate, zinc chloride, zinc bromide, zinc iodide, zinc oxychloride, zinc stearate and mixtures thereof.

18. A process according to claim 17 wherein the amount of the zinc component used is in the range of about 15 to about 60 weight percent based on the total weight of the components.

19. A process according to claim 18 wherein said alumina component consists essentially of alumina.

20. A process according to claim 19 wherein the amount of the alumina component used is in the range of about 30 to about 75 weight percent based on the total weight of the components.

21. A process according to claim 20 wherein said dispersant component is selected from the group consisting of condensed phosphates, sulfonated polymers and mixtures thereof.

22. A process according to claim 21 wherein the amount of the dispersant component used is in the range of about 0.1 to about 8 weight percent based on the total weight of the components.

23. A process according to claim 22 wherein the amount of acid in the acid component is in the range of about 0.1 to about 10 volume percent based on the total weight of the components.

24. A process to produce a particulate composition that comprises zinc aluminate, where said particulate composition comprises particles that have a size from about 30 to about 1000 microns, said process comprising:
    (a) contacting
        (1) a zinc component,
        (2) an alumina component,
        (3) a dispersant component,
        (4) a binder component, and
        (5) an acid component to form a mixture, where said mixture is capable of being spray dried; and then
    (b) spray drying said mixture to form particles; and then
    (c) calcining said particles to combine said zinc component and said alumina component to produce a particulate composition that comprises zinc aluminate, where said particulate composition comprises particles that have a size from about 10 to about 1000 microns and where said calcining is conducted at a temperature in the range of about 300° C. to about 1200° C. for a time in the range of about 0.5 to about 12 hours;
wherein said zinc component is zinc oxide, or any other zinc compound, which can combine with said alumina component to form zinc aluminate during step (c), and wherein said alumina component comprises alumina, or aluminosilicate, where said alumina component can combine with said zinc component to form zinc aluminate during step (c), and wherein said dispersant component promotes the spray drying ability of said mixture, and wherein said binder component is a cement or clay, and wherein said acid component is an organic acid or a mineral acid that promotes the combination of the zinc component and the alumina component to form zinc aluminate.

25. A process according to claim 24 wherein said zinc component is selected from the group consisting of zinc oxide, zinc sulfide, zinc sulfate, zinc hydroxide, zinc carbonate, zinc acetate, zinc nitrate, zinc chloride, zinc bromide, zinc iodide, zinc oxychloride, zinc stearate and mixtures thereof.

26. A process according to claim 25 wherein the amount of the zinc component used is in the range of about 15 to about 60 weight percent based on the total weight of the components.

27. A process according to claim 26 wherein said alumina component consists essentially of alumina.

28. A process according to claim 27 wherein the amount of the alumina component used is in the range of about 30 to about 75 weight percent based on the total weight of the components.

29. A process according to claim 28 wherein said dispersant component is selected from the group consisting of condensed phosphates, sulfonated polymers and mixtures thereof.

30. A process according to claim 29 wherein the amount of the dispersant component used is in the range of about 0.1 to about 8 weight percent based on the total weight of the components.

31. A process according to claim 30 wherein the amount of the binder component used is in the range of about 1 to about 20 weight percent based on the total weight of the components.

32. A process according to claim 31 wherein the amount of acid in the acid component is in the range of about 0.1 to about 10 volume percent based on the total volume of the acid component.

33. A process according to claim 7 wherein said particles have a size from 30 to about 1000 microns.

34. A process according to claim 33 wherein said particles have a size from about 50 to about 1000 microns.

35. A process according to claim 34 wherein said particles have a size from about 50 to about 300 microns.

36. A process according to claim 15 wherein said particles have a size from 30 to about 1000 microns.

37. A process according to claim 36 wherein said particles have a size from about 50 to about 1000 microns.

38. A process according to claim 37 wherein said particles have a size from about 50 to about 300 microns.

39. A process according to claim 23 wherein said particles have a size from 30 to about 1000 microns.

40. A process according to claim 39 wherein said particles have a size from about 50 to about 1000 microns.

41. A process according to claim 40 wherein said particles have a size from about 50 to about 300 microns.

42. A process according to claim 32 wherein said particles have a size from 30 to about 1000 microns.

43. A process according to claim 42 wherein said particles have a size from about 50 to about 1000 microns.

44. A process according to claim 43 wherein said particles have a size from about 50 to about 300 microns.

* * * * *